United States Patent [19]

Hanahata et al.

[11] Patent Number: 5,541,280

[45] Date of Patent: Jul. 30, 1996

[54] LINEAR SEGMENTED POLYURETHANEUREA AND PROCESS FOR PRODUCTION THEREOF

[75] Inventors: Hiroyuki Hanahata, Otsu; Seiji Goto, Moriyama, both of Japan

[73] Assignee: Asahi Kasei Kogyo Kabushiki Kaisha, Osaka, Japan

[21] Appl. No.: 200,303

[22] Filed: Feb. 23, 1994

Related U.S. Application Data

[63] Continuation of Ser. No. 965,295, filed as PCT/JP92/00746 Jun. 11, 1992, abandoned.

[30] Foreign Application Priority Data

Jun. 13, 1991 [JP] Japan ..................................... 3-141583

[51] Int. Cl.⁶ .................................................. C08G 18/10
[52] U.S. Cl. ................... 528/48; 528/51; 528/52; 528/61; 528/906; 528/76; 524/710; 524/726; 524/874
[58] Field of Search ..................... 524/710, 726, 524/874; 528/61, 51, 52, 906, 48

[56] References Cited

U.S. PATENT DOCUMENTS

| | | | |
|---|---|---|---|
| 2,929,804 | 3/1960 | Steuber | 528/61 |
| 3,179,625 | 4/1965 | Ehrhart | 528/48 |
| 3,509,102 | 4/1970 | Horn et al. | 528/906 |
| 4,940,750 | 7/1990 | Rosthauser et al. | 528/44 |

FOREIGN PATENT DOCUMENTS

| | | |
|---|---|---|
| 663860 | 11/1965 | Belgium . |
| 49-92202 | 9/1974 | Japan . |
| 50-50496 | 5/1975 | Japan . |
| 51393 | 12/1966 | Luxembourg . |
| 870292 | 6/1961 | United Kingdom . |
| 1112462 | 5/1968 | United Kingdom . |

OTHER PUBLICATIONS

Dec. 13, 1993 European Search Report in EAA 92 91 1110.2 with Annex.

*Primary Examiner*—Rachel Johnson
*Attorney, Agent, or Firm*—Finnegan, Henderson, Farabow, Garrett & Dunner

[57] ABSTRACT

A linear segmented polyurethaneurea having a degree of branching (Nb) of 3 or less and obtained by chain-extending a prepolymer with an organic diamine in an organic solvent comprising dimethylformamide or dimethylacetamide, wherein the prepolymer has an isocyanate group at the both ends thereof and comprises a stoichiometrically excessive amount of a diisocyanate component selected from 4,4'-diphenylmethane diisocyanate, 2,4-toluene diisocyanate and 1,4-phenylene diisocyanate and a diol component having a number average molecular weight of 500 to 6000.

4 Claims, 1 Drawing Sheet

LINEAR SEGMENTED POLYURETHANEUREA AND PROCESS FOR PRODUCTION THEREOF

This application is a continuation, of application Ser. No. 07/965,295 filed as PCT/JP92/00746 Jun. 11, 1992, now abandoned.

TECHNICAL FIELD

The present invention relates to a linear segmented polyurethaneurea and a process for producing the same. More specifically, the present invention is concerned with a linear segmented polyurethaneurea having a remarkably small degree of branching in the polymer and useful for stably producing an elastic fiber having high physical properties, and a process for producing a high concentration solution thereof with high productivity.

BACKGROUND ART

Polyurethane is applied in a wide range of fields such as foams, adhesives, paints, elastomers, artificial leather and fibers, and there are many useful polyurethane products.

Among them, a polyurethaneurea elastic fiber, which is especially required to have a high elasticity, usually comprises a segmented polyurethaneurea and is produced by the "two-stage process" comprising the following two stages (1) and (2): (1) First, a diisocyanate component and a diol component are reacted with each other in a molten state to give a molten prepolymer having at both ends thereof an isocyanate group, which is then dissolved in a solvent such as dimethylformamide or dimethylacetamide to prepare a prepolymer solution (melt synthetic process). Alternatively, both the components may be directly reacted with each other in the above-mentioned solvent to prepare a prepolymer solution (solution synthetic process). (2) Then, the prepolymer is subjected to chain extension with aliphatic diamines as disclosed in U.S. Pat. No. 2929804 to prepare a segmented polyurethaneurea solution, and then the solvent is removed from the solution to give a polyurethaneurea elastic fiber. However, since unfavorable side reactions (crosslinking reactions) are liable to occur in the course of the production of the above-mentioned polymer, the resultant final polymer has a high degree of a branched structure, and this renders the polymer solution liable to become highly viscous or gelled. Even though a method wherein the productivity is not taken into consideration is used, for example, a lowering in the concentration of the polymer solution, the liability of the polymer solution to gelation cannot be completely eliminated. Further, a lowering in the solution viscosity occurs due to breaking of the branching in the subsequent step, such as incorporation of a stabilizer, which makes it difficult to stably conduct molding such as spinning due to the presence of a microgel in the polymer. To solve this problem, Japanese Examined Patent Publication (Kokoku) Nos. 41-3472, 44-22311 and 47-35317 disclose methods wherein the branched structure of the polymer is reduced to lower the viscosity to a value suitable for molding. The reduction of viscosity results from the chain scission reaction, which requires considerable time. In some cases, the polymer solution is colored or loses its transparency. Further, the microgel cannot be completely removed, so that yarn breakage still occurs during spinning; for example, when a yarn having a small denier is spun or a spinning rate is increased. It is also possible to prepare a polymer solution having a viscosity suitable for molding through a lowering in the molecular weight or concentration of the polymer, without cutting the branching, and then conduct the molding. In this method, however, it is difficult to avoid a change in the viscosity due to the reduction of branching in the subsequent step, so that a difficulty arises in stably conducting the molding. Therefore, a molded article having high physical properties cannot be prepared, and as mentioned above, the productivity of the polymer solution is also lowered.

On the other hand, an attempt has been made to prepare from the outset polymer having a small degree of branching through the suppression of a branching reaction (a crosslinking reaction). For example, Keiji Iwata "Poriurethan Jushi (Polyurethane Resin)" (The Nikkan Kogyo Shinbun, Ltd.) describes that an acidic substance has the effect of suppressing a crosslinking reaction, when the prepolymer reaction is carried out in a neutral solvent such as toluene or in the absence of a solvent. This is because, we believe, an alkaline compound, which is used as a catalyst for preparing the starting diol component and remains in the starting diol component and which accelerates the crosslinking reaction, is neutralized and deactivated. Contrary to this, in the case of, for example, dimethylformamide (pKa=−0.01) and dimethylacetamide (pKa=−0.18), which are a good solvent for the present segmented polyurethaneurea and a basic solvent, even when a small amount of an acidic substance is added thereto, the action or effectiveness as an acid is decreased. Furthermore, the above-mentioned solvents are decomposed, in the presence of an acidic substance, to an amine and a carboxylic acid and, as a result, the acidic substance added is reacted with the decomposed amine to form a neutral salt. Although the carboxylic acid remains, the carboxylic acid does not substantially act as an acid in the above-mentioned solvents. Thus, in such a basic solvent, it is considered that the acidic substance does not have an effect to inhibit the crosslinking reaction, unlike a solvent (e.g., toluene) which is neutral and which is not decomposed. However, surprisingly, it has been found that, when the prepolymer solution is produced by a solution synthetic process or a bulk synthetic process, as mentioned above, in the above-mentioned basic solvent, the prepolymer is chain-extended with an organic diamine, when a small amount of an acidic substance is previously added, and the branching structure in the resultant polymer is remarkably small. However, in some cases, a polymer solution in a gel form with a high viscosity and a high degree of branching or a polymer solution having a small degree of branching but a remarkably low solution viscosity and suffering from a loss of transparency to be prepared. Consequently, the spinnability of these polymer solutions was unstable, the resultant elastic fiber had low physical properties, and the physical properties were varied to a great extent and instable.

Thus, when a segmented polyurethaneurea solution is produced by preparing a prepolymer solution according to a solution synthesis process or a melt synthesis process, and the prepolymer solution subjected to chain extension, in the prior art, a solution which made possible stable production of providing an article having high physical properties, that is, a homogeneous, transparent solution of a segmented polyurethaneurea having a remarkably small degree of branching in the polymer was not possible.

DISCLOSURE OF INVENTION

Accordingly, the objects of the present invention are to provide a linear segmented polyurethaneurea having a remarkably small degree of branching in the polymer capable of stably molding an article having high physical properties and to provide a process which makes possible a stable production of a homogeneous, transparent solution of said polyurethaneurea at a high productivity.

In accordance with the present invention, there is provided a linear segmented polyurethaneurea having a degree of branching (Nb) of 3 or less and obtained by chain-extending a prepolymer with an organic diamine in an organic solvent comprising dimethylformamide or dimethylacetamide, said prepolymer having an isocyanate group at the both ends thereof and comprising a stoichiometrically excessive amount of a diisocyanate component selected from 4,4'-diphenylmethane diisocyanate, 2,4-toluene diisocyanate and 1,4-phenylene diisocyanate and a diol component having a number average molecular weight of 500 to 6000.

In accordance with the present invention, there is also provided a process for producing a linear segmented polyurethaneurea solution, comprising:

preparing a prepolymer solution by reacting a stoichiometrically excessive amount of a diisocyanate component selected from 4,4'-diphenylmethane diisocyanate, 2,4-toluene diisocyanate and 1,4-phenylene diisocyanate with a diol component having a number average molecular weight of 500 to 6000 in the presence of dimethylacetamide or dimethylformamide as a solvent to prepare a solution of prepolymer having an isocyanate group at the both ends thereof or reacting both said diisocyanate component and said diol component in a molten state in the absence of a solvent to prepare a molten prepolymer and dissolving the prepolymer in a solvent to give a prepolymer solution, and chain-extending the prepolymer in the resultant prepolymer solution with an organic diamine to prepare a segmented polyurethaneurea solution, wherein said prepolymer is prepared in the presence of an acidic substance having an acid dissociation index of 9 or less in the solvent in an amount (mol/kg of prepolymer solution) within the range defined by:

$X \leq$ amount of acidic substance added (mol/kg of prepolymer solution) $\leq A/100$ wherein $X = A \times B \times [1 - e^{(B-A)kt}]/[A - B \times e^{(B-A)kt}]$, wherein A in the case of the synthesis of the prepolymer solution is a value (mol/kg of prepolymer solution) obtained by subtracting the initial concentration of the hydroxyl group at both ends in the diol component from the initial concentration of the isocyanate group in the diisocyanate component and A in the case of the synthesis of molten prepolymer is the concentration (mol/kg of prepolymer solution) of the isocyanate group at both ends of the prepolymer, and B in the case of the synthesis of prepolymer solution is the initial concentration (mol/kg of prepolymer solution) of the solvent and B in the case of the synthesis of molten prepolymer is the concentration (mol/kg of prepolymer solution) of the solvent used in the dissolution, t in the case of the synthesis of prepolymer solution is a time taken for producing the prepolymer (min) and t in the case of the synthesis of molten prepolymer is a time taken for dissolving the prepolymer (min), respectively, and $$k = C \times 10^6 \times e^{(-E/RT)}$$

wherein C (kg/mol/min) and E (kcal/mol) are a coefficient of frequency and an activation energy, respectively, T in the case of the synthesis of a prepolymer solution is a temperature for producing a prepolymer solution and T in the case of the synthesis of molten prepolymer is a prepolymer temperature (K) at the time of dissolution and R is a gas constant ($1.9859 \times 10^{-3}$ kcal/mol.K).

BRIEF DESCRIPTION OF THE DRAWINGS

The present invention will be better understood from the description set forth below with reference to the accompanying drawing of FIG. 1, which is a flow diagram illustrating one example of a continuous production of a linear segmented polyurethaneurea solution according to the present invention.

BEST MODE OF CARRYING OUT THE INVENTION

Figure 1:
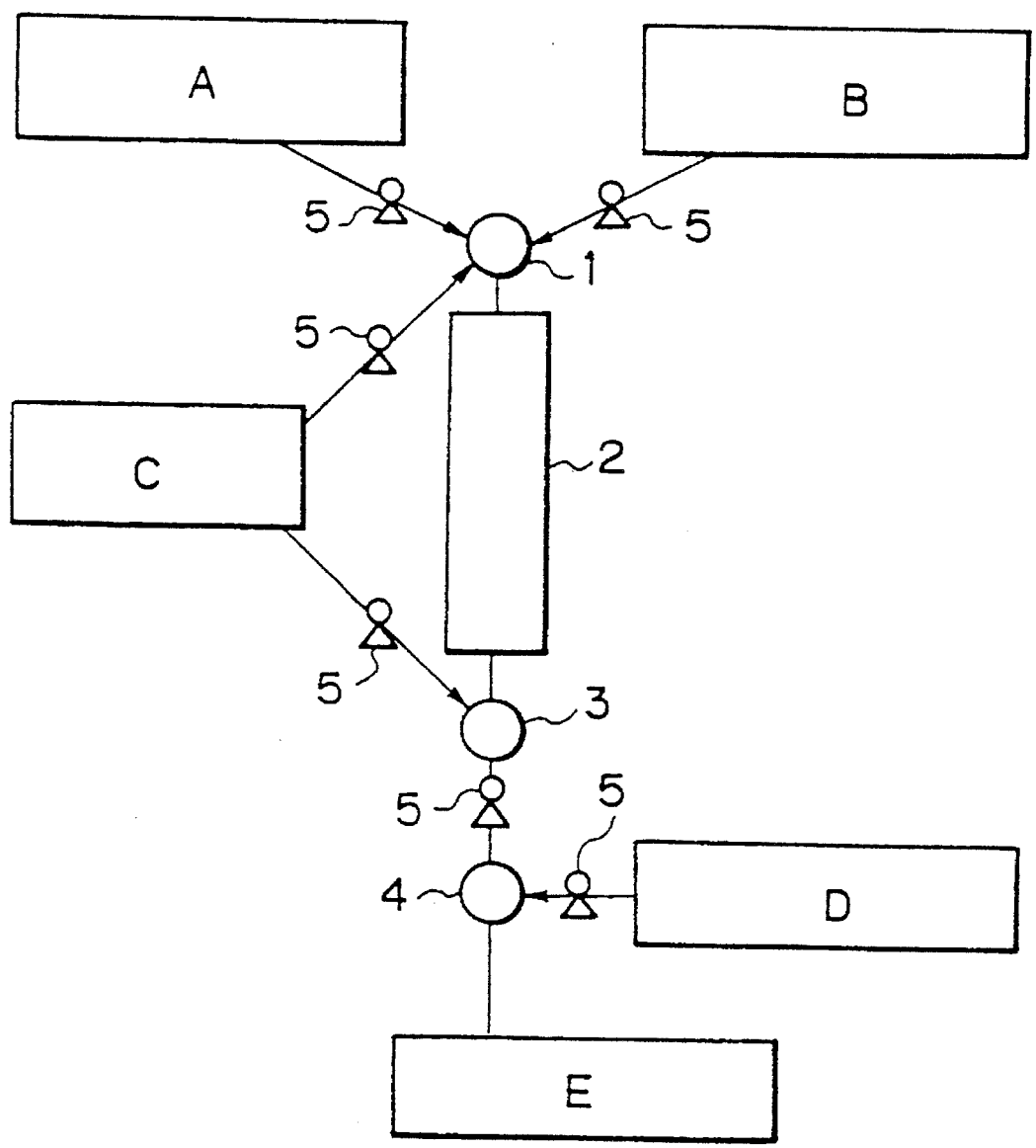

The present inventors made extensive and intensive studies with a view to solving the above-mentioned problems, and as a result, found that a high-concentration linear segmented polyurethaneurea solution having a degree of branching of 3 or less in the polymer enables the frequency of yarn breakage to be significantly reduced and the physical properties of the molded article to be significantly improved over the conventional molded articles, that the amount of formation of branching-reaction accelerating substances varies depending upon the diisocyanate component and the kind and concentration of the solvent and, in the case of the solution synthesis process, the production temperature and time of the prepolymer and the concentration of the prepolymer, and in the case of the melt synthesis process, the dissolution temperature and time of the prepolymer and the concentration of the prepolymer and that when a prepolymer solution is produced in the presence of a particular acidic substance in a particular amount range, a homogeneous, transparent solution of a linear segmented polyurethaneurea having a degree of branching of 3 or less and an excellent spinnability and quality (physical properties) can be produced in a high concentration with high productivity, which has led to the completion of the present invention. The present invention will now be described in more detail.

The diol component usable in the present invention is a diol having a number average molecular weight of 500 to 6000, preferably 900 to 2500, and selected from the group consisting of polyester diols, polyether diols and polycarbonate diols.

Examples of the polyester diol include polyester diols having a melting point of 60° C. or less, preferably 40° C. or less produced from one or a mixture of glycol compounds such as ethylene glycol, 1,4-butanediol, 1,6-hexanediol and neopentyl glycol, one or a mixture of aliphatic dicarboxylic acids such as succinic acid, glutaric acid, adipic acid, suberic acid and azelaic acid and further a dicarboxylic acid, which may partially contain an aromatic dicarboxylic acid such as terephthalic acid or isophthalic acid. These may be used alone or in any combination of two or more thereof.

Examples of the polyether diol include polytetramethylene ether glycol, polycaprolactonediol, polyethylene ether glycol and polypropylene ether glycol.

Examples of the polycarbonate diol include poly(butane-1,4-carbonatediol, poly(pentane-1,3-carbonatediol), poly-(pentane-1,5-carbonatediol) and poly(hexane-1,6-carbonatediol) prepared by reacting a dialkyl carbonate or the like with a hydroxy compound, for example, 1,4-butanediol, 1,5-pentanediol, 1,3-pentanediol or 1,6-hexanediol; and their copolymers and mixtures.

In the present invention, it is preferred to produce the prepolymer in a molar ratio of the diisocyanate group to the diol group of 1.3 to 2.5. When the molar ratio is outside the above-mentioned range, the physical properties inherent in the prepolymer serving as a soft segment are unfavorably lowered.

The organic diamine as a chain extender of the prepolymer usable in the present invention may be any of known aliphatic, alicyclic and aromatic diamines. For example, the organic diamine is selected from the group consisting of ethylenediamine, propylenediamine, buthylenediamine, hexamethylenediamine, cyclohexylenediamine, piperazine, 2-methylpiperazine, phenylenediamine, tolylenediamine, xylenediamine, 3,3'-dichloro-4,4'-biphenyldiamine, 2,6-diaminopyridine, 4,4'-diaminodiphenylmethane, hydrogenated m-phenylenediamine, p-phenylenediamine, tetrachloro-m-phenylenediamine, tetrachloro-p-phenylenediamine and the mixtures thereof.

Furthermore, diaminourea compounds comprising organic diisocyanates and organic diamines, disclosed in Japanese Patent Application No. 4-116692 filed Apr. 10, 1992 are also included as the organic diamines usable in the present invention. Examples of such compounds are N,N'-(methyledi-4,1-phenylene)bis[2-(ethylamino)-urea] (Compound 1), N,N'-(methylenedi-4,1-phenylene) bis[2-(2-methylethylamino-urea] (Compound 2), N,N'-(methylenedi-4,1-phenylene)bis[6-hexylamino)-urea] (Compound 3) and the compounds 4–13 represented by the following formulae.

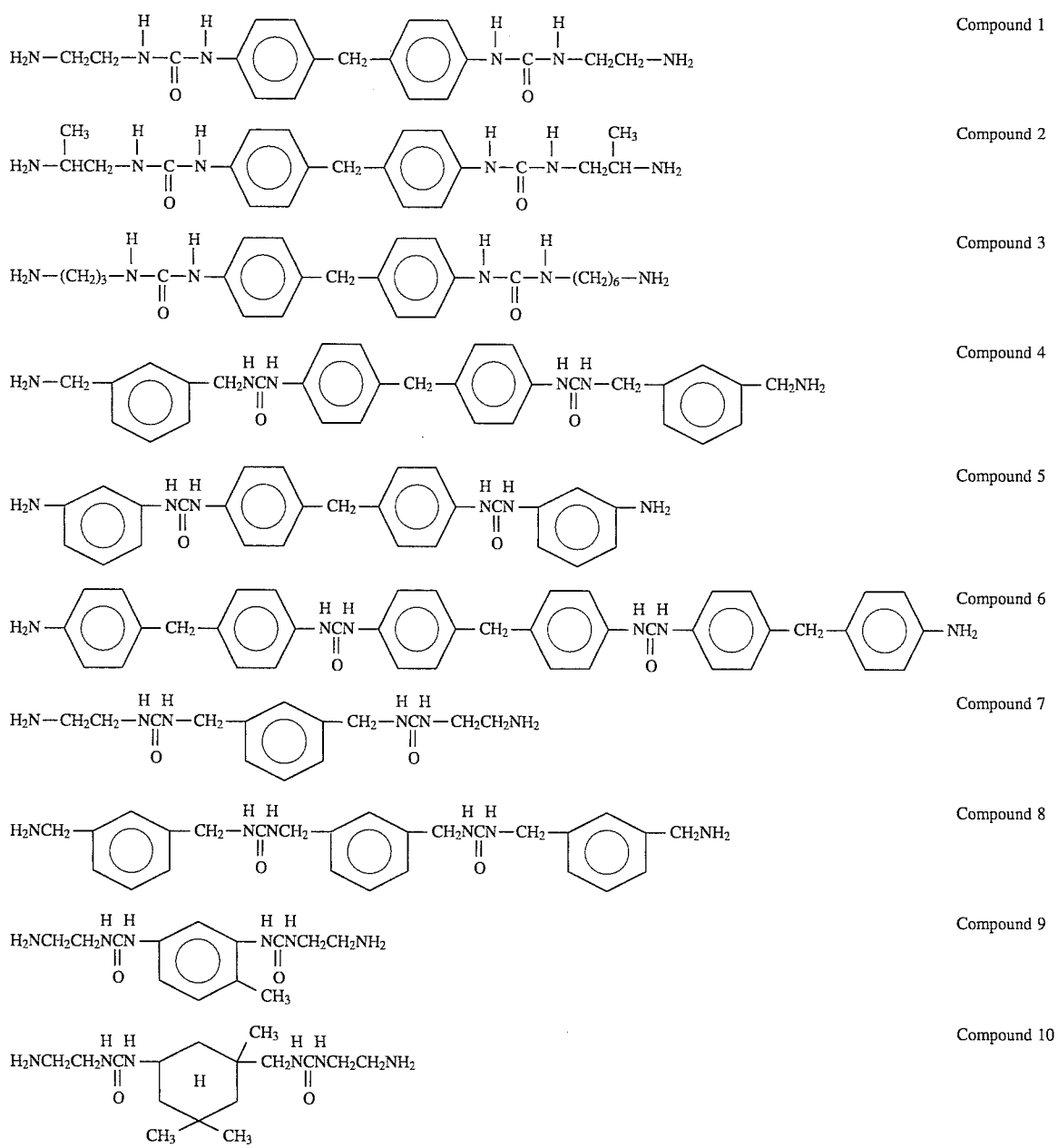

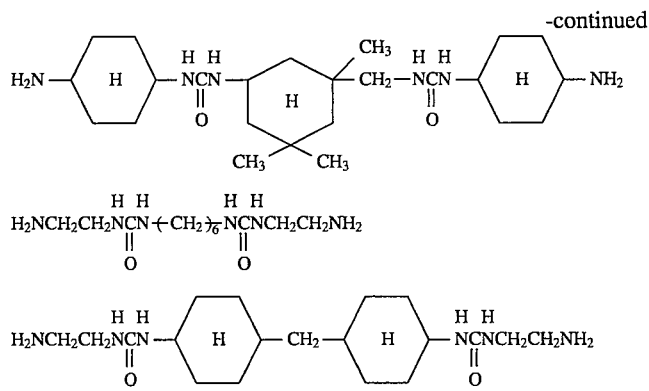

Compound 11

Compound 12

Compound 13

The amount of the chain extender usable in the present invention is preferably within the range of 80 to 98%, based on the stoichiometric amount, of the free isocyanate content of the prepolymer. When the amount is smaller than the above-mentioned range, the molecular weight of the polymer becomes so small that a high physical property is not obtained. On the other hand, when the amount is larger than the above-mentioned range, the molecular weight of the polymer becomes so large that it becomes impossible to conduct molding. In this case, a chain terminator, for example, diethylamine or diethanolamine, may be used as a molecular weight modifier for the polymer.

Examples of the acidic substance suitable for use in the present invention include acid chlorides, phosphoric esters, boric esters, phosphorous esters, sulfonic acids, oxy acids, sulfurous acid gas and inorganic acids which exhibit and acid dissociation index of 1 to 9 in a dimethylformamide or dimethylacetamide solvent. For example, the acidic substance is at least one member selected from benzoyl chloride, alkylphosphoric acids, benzenesulfonic acid, p-toluenesulfonic acid, sulfurous acid gas, hydrochloric acid and sulfuric acid. When the acid dissociation index of the acidic substance is more than 9, a branch accelerating substance present in the prepolymer solution cannot be completely neutralized, so that the effect of preventing branching is small. The acid dissociation index is a logarithmic value of the reciprocal of the acid dissociation constant (25° C.) as measured according to a method described in Kagakubinran Kisohen II (published by Kagaku Dojin Sha).

The amount of addition of the acidic substance should be in a range represented by the following formula.

$X \leq$ amount of acidic substance added (mol/kg of prepolymer solution) $\leq A/100$
wherein $X = A \times B \times [1-e^{(B-A)kt}]/[A-B \times e^{(B-A)kt}]$, A, in the case of the synthesis of the prepolymer solution, is a value (mol/kg of prepolymer solution) obtained by subtracting the initial concentration of the hydroxyl group at both ends in the diol component from the initial concentration of the isocyanate group in the diisocyanate component, and A, in the case of the synthesis of molten prepolymer in another process, is the concentration (mol/kg of prepolymer solution) of the isocyanate group at both ends of the prepolymer;

B, in the case of the synthesis of prepolymer solution, is the initial concentration (mol/kg of prepolymer solution) of the solvent, and B, in the case of another synthetic process, is the concentration (mol/kg of prepolymer solution) of the solvent used in the dissolution;

t, in the case of the synthesis of prepolymer solution, is a time taken for producing the prepolymer (min), and t, in the case of another synthetic process, is a time taken for dissolving the prepolymer (min), respectively, and $k = C \times 10^6 \times e^{(-E/RT)}$ wherein T, in the case of the synthesis of a prepolymer solution, is a temperature (K) for producing a prepolymer solution, and T, in the case of another synthetic process, is a prepolymer temperature (K) at the tame of dissolution and R is a gas constant ($1.9859 \times 10^{-3}$ cal/mol.K). C (coefficient of frequency, kg/mol/min) and E (activation energy, kcal/mol) are each a constant determined by a combination of the diisocyanate with the solvent and are given in Table 1.

TABLE 1

| | | Solvent | |
|---|---|---|---|
| Isocyanate | | dimethyl-formamide | dimethyl-acetamide |
| 4,4'-diphenylmethane | C value | 20.0 | 2.5 |
| diisocyanate | E value | 16.8 | 17.9 |
| 2,4-toluene | C value | 30.0 | 3.5 |
| diisocyanate | E value | 16.9 | 18.1 |
| 1,4-phenylene | C value | 40.0 | 4.5 |
| diisocyanate | E value | 13.9 | 14.9 |

When the amount of the acidic substance added is less than the above-mentioned range (smaller than the X value in the formula), the degree of branching of the polymer becomes so large that the polymer solution becomes highly viscous and is gelled. As a result, a polymer solution of high concentration cannot be prepared, which causes the productivity to be lowered. Further, in the subsequent step such as incorporation of a stabilizer, a lowering of the solution viscosity occurs due to a scission of the branches at the main chain, which makes it difficult to stably conduct molding. Further, the presence of a microgel in the polymer leads to a yarn breakage during a molding process, such as spinning. On the other hand, when the amount of the added acidic substance is larger than the above-mentioned range (larger than A/100 in the formula), the capability of the organic diamine to act as the chain extender is reduced due to the presence of excess acidic substance during chain extension, so that a polymer having a desired molecular weight cannot be obtained, which makes it impossible to prepare a polymer solution capable of providing a molded article having high physical properties. Further, the polymer solution becomes liable to a loss of transparency with the elapse of time, which leads to various problems in the process. The timing at which the acidic substance is added is preferably at the time when the reaction is started, but the acidic substance can be added until the conversion of the isocyanate group to the urethane group becomes 95%.

In the present invention, the reaction temperature for producing a prepolymer is preferably 5 to 70° C. for the prepolymer solution synthesis. When the temperature is less than 5° C., the production time becomes remarkably long, and if the temperature is more than 70° C., reactions other than the above-mentioned side reactions, for example, trimerization of the isocyanate group or the like becomes significant. In the case of the melt synthesis, the reaction temperature for producing a prepolymer is preferably 30 to 120° C. Temperature conditions which are outside this range are unfavorable for the same reason as that in the case of the prepolymer solution synthesis.

The reaction temperature for the chain extension reaction is preferably 0 to 30° C. When the temperature is below this range, the solubility of the polymer deteriorates, so that the system becomes heterogeneous. On the other hand, when the temperature is above this range, the reaction of the isocyanate group with the amino group becomes so rapid that it becomes difficult to control the reaction.

The linear segmented polyurethaneurea of the present invention thus prepared has a degree of branching (Nb) of 3 or less. The homogeneous, transparent solution is stable and brings little lowering in the viscosity in the steps after the production thereof. Further, the viscosity is so low that the concentration of the polymer solution can be made higher than that in the case of the prior art, which contributes to an improvement in the productivity. Further, since the solution is homogeneous and transparent, it has an excellent stability at the time of molding, such as during spinning, so that the frequency of a yarn breakage during spinning becomes remarkably low compared with that in the case of the prior art. Further, the molded article exhibits high physical properties and is satisfactory.

In the production of the linear polyurethaneurea mentioned above, the prepolymer reaction and the chain extension reaction can be carried out in a batchwise manner. When the prepolymer is prepared batchwise, the concentration of the isocyanate group in the prepolymer solution is sometimes varied due to the change in the charge ratio of the starting materials in each batch or due to the unevenness in the reaction temperature in the system which is often observed in a large sized reaction vessel. Furthermore, when the prepolymer is retained in the reaction vessel for some period, the side reaction leading to the formation of the crosslinked structure is liable to occur. In addition, when the chain extension reaction is carried out in a batchwise manner, the reaction sometimes proceeds before the uniform mixing of the prepolymer solution and the amine solution due to the fact that the reaction between the isocyanate group and the amino group is very fast, and therefore, the polymers possessing the desired properties are not always obtained. Although these problems can be solved from the engineering viewpoints (e.g., the use of high accuracy weigher and the use of the specially designed agitating blades so as to uniformly mixing the solution in a reaction vessel) to some extent, it is not still sufficient and changing from a batchwise process to a continuous process for the production of both of the prepolymer and polymer solutions is preferable.

For example, the continuous syntheses of the prepolymer and polymer solutions can be carried out as follows. Namely, as shown in FIG. 1, starting material flows of the stoichiometrically excessive amount of the diisocyanate component A, the diol component B and the solvent C are continuously charged by quantitative charging pump 5 and mixed in mixer 1. The urethane-forming reaction is carried out in reactor 2 in FIG. 1 to obtain a solution of the prepolymer having an isocyanate group at both ends thereof. Alternatively, the diisocyanate component A and the diol component B are continuously mixed to effect the urethane-forming reaction, followed by continuously adding the solvent C to the resultant molten prepolymer and mixed in mixer 3 to form the desired prepolymer solution. Therefore, the prepolymer solution and the organic diamine D are continuously charged by quantitative charging pumps 5 and mixed in mixer 4 to effect the chain extension. Thus, the desired polymer solution E is obtained.

The diisocyanate component, the diol component, the solvent and the organic diamine usable in the continuous production according to the present invention are those used in the above-mentioned batchwise process. The molar ratio of the diisocyanate component and the diol component, the amount of the chain extender and the kind and amount of the acidic substance are also the same as those in the batchwise process. Furthermore, the reaction temperature at which the prepolymer solution is produced and the chain extension reaction is carried out.

In the continuous production process of the prepolymer and polymer solutions according to the present invention, the above-mentioned continuous mixing of the starting material flows of the diisocyanate component, the diol component and the solvent and the continuous mixing of the prepolymer solution and the organic diamine solution can be carried out in any conventional mixer such as a static type or dynamic type mixer, as long as the sufficient mixing effect can be obtained.

The reactor usable in the continuous production of the prepolymer solution includes, for example, a pipe-line type hollow tube reactor, a pipe-line type reactor provided with a static mixer, a complete mixing vessel series type reactor, and a single- or multi-screw extrusion type reactor described in "Polymer Extrusion" by Chris Rauwendeal, Hanser Publishers, 1986.

The degree of branching of the linear segmented polyurethaneurea according to the continuous process as mentioned above is further smaller than that obtained in the batchwise process and the resultant polymer solution is homogeneously transparent. Accordingly, the molding stability of, for example, spinning and the high physical properties of the molded articles after molding are obtained. Thus, the resultant product according to the above-mentioned continuous production is further satisfactory than that according to the batchwise product.

The degree of branching (Nb) is an index for indicating the density of allophanate and biuret structure and can be determined by the following chemical degradation method wherein n-butylamine is used. The reduced viscosity ($\eta$sp/C) of a 0.005 g/ml DMAc solution of the segmented polyurethaneurea contemplated in the present invention is measured at 25° C. after adding 0.1% by volume of n-butylamine to the solution, and assumed to be D ml/g. The resultant solution is treated at 50° C. for 4 hr and the reduced viscosity ($\eta$sp'/C) after the treatment is assumed to be E ml/g. The degree of branching (Nb) defined by the following equation through the use of a change in the reduced viscosity before and after heating is calculated.

$$Nb=(D-E)/D\times 100$$

Okuto (Macromol. Chem., 98, 148 (1966)) and Furukawa and Yokoyama et al. (J. Polym Sci., Polym. Lett. Ed., 17, 175 (1979)) have proved that only both branching structures of allophanate and biuret are quantitatively degraded by this method.

Whether or not the polymer solution is homogeneous and transparent was judged from the results of the following two measurements. (i) The transmittance of a 30 wt. % solution of the polymer in dimethylformamide or dimethylacetamide is 90% or more. The transmittance was measured by a turbidimeter (model LT-11 manufactured by Nissei Sangyo K.K.) after the polymer solution was allowed to stand at 20° C. for two weeks. (ii) Neither microgel nor macrogel having a size capable of being seen with the naked eye was observed after the polymer solution was allowed to stand at 20° C. for two weeks. That no microgel is present is intended to mean that a particle having a size of 50 μm or more is absent in a 1 wt. % solution of the polymer in dimethylformamide or dimethylacetamide. There are many methods of measuring microgel particles. In the present invention, a Coulter counter (model TA-2 manufactured by Coulter Electronics) was used.

EXAMPLES

The present invention will now be described in more detail with reference to the following Examples.

The parts in Examples are by weight (g) unless otherwise specified. The molding stability of the polymer solution was evaluated based on the results of two tests, that is, the difference between the viscosity after stirring (shear rate: 1 sec$^{-}$) the polymer solution at 80° C. for 5 hr through the use of a rotary cylindrical rheometer and the initial viscosity before stirring, and the frequency of a yarn breakage when the polymer solution is continuously dry-spun into a 40 denier/4 filament yarn for 10 hr at a spinning rate of 500 m/min. When the lowering in the viscosity of the polymer is small and the frequency of a yarn breakage is very small, the molding stability was evaluated as "+". When the lowering in the viscosity of the polymer is large and the frequency of breaking of yarn is very large, the molding stability was evaluated as "−". When the lowering in the viscosity of the polymer and the frequency of a yarn breakage are between the above-described two cases, the moldability was evaluated as "±".

The yarn thus obtained was measured by a general method according to ASTM-D-273-72. In each measurement, a 5-filament yarn having a gauge length of 5 cm was used. The sample was once elongated at a constant tensile rate of 1000% per min to measure 100% modulus (g), elongation at break (%) and strength (g).

The absorbance at 1688 cm$^{-1}$ derived from the stretching vibration of the carbonyl group of the crosslinked structure, i.e., Av(C=0, 1688 cm$^{-1}$) and the absorbance at 1610 cm$^{-1}$ derived from stretching vibration of the benzene ring, i.e., Av'(C=C, 1610 cm$^{-1}$), in the polymer are determined as follows. A 20 wt. % polymer solution is dried by a casting (Film forming conditions: under reduced pressure (2 Torr), 50° C. 24 hr) to obtain a polymer film having a thickness of 10 μm. The infrared absorption of this film at the region of 1750 cm$^{-1}$ to 1600 cm$^{-1}$ is measured by a permeation process using FT-1R, Model FTS-60A manufactured by BIO-RAD. According to Yamamoto et al method (see Polymer J., Vol. 21, No. 11, 1989), the infrared spectrum of a linear polymer in the above-mentioned range is divided into 9 individual peaks by a curve fitting method (i.e., the peak position of each wave number is 1737, 1730, 1709, 1685, 1665, 1638, 1633, 1610 and 1592 cm$^{-1}$, from a high wave number side). From the absorbance at 1688 cm$^{-1}$ and 1610 cm$^{-1}$ after dividing the wave form, the ratio of both the absorbance, i.e., Av(C=0, 1688 cm$^{-1}$)/ Av(C=C, 1610 cm$^{-1}$) can be determined.

Example 1

In this Example, an acidic substance was added in an amount of $1.1 \times 10^{-4}$ mol, that is, twice the minimum necessary amount, X, at the time of the reaction of a prepolymer solution to prepare a prepolymer solution which was then subjected to a chain extension reaction to give a polymer solution. First, a reaction vessel equipped with a stirrer, a thermometer and a nitrogen seal tube was charged with 570 parts of dimethylacetamide (DMAc), then 470 parts of polytetramethylene ether glycol (PTMG, Number average molecular weight Mn=2000) and finally 100 parts of 4,4'-diphenylmethane diisocyanate (MDI), and a prepolymer reaction was conducted in a 50 wt. % DMAc solution at 30° C. for 90 min. In this case, 15.4 mg ($1.1 \times 10^{-4}$ mol) of benzoyl chloride was accurately weighed and added within the reaction vessel. The residual isocyanate group concentration at the time of the completion of the reaction was 0.271 mol. The residual isocyanate group concentration was determined by a method described in Analytical Chemistry of Polyurethanes (New York, Wiley-Interscience, 1969) and the like. Thereafter, 514 parts of a DMAc solution containing 7.6 parts of ethylenediamine (EDA) and 1.3 parts of diethylamine (DEA) was prepared (number of moles of EDA/number of moles of DEA=7.12, polymer concentration=35% by weight), and rapidly added at 15° C. to a prepolymer solution stirred at a high speed. The chain reaction was finished when the solution exhibited no absorption at 2260 cm$^{-1}$ derived from an isocyanate group.

The degree of branching (Nb) of this polymer is 2.5, the appearance of the polymer solution is homogeneous and transparent, the molding stability is extremely good and the elastic yarn (40d) exhibited an extremely high physical properties (i.e., the modulus at 100% elongation, strength at break and elongation were 3.2 g, 72 g and 750%, respectively). Furthermore, the infrared absorption ratio of the double bond of the carbonyl group and the double bond of the benzene ring of the resultant polymer was 0.1 or less.

$$\frac{Av(C=0, 1688 \text{ cm}^{-1})}{Av'(C=C, 1610 \text{ cm}^{-1})}$$

wherein Av(C=0, 1688 cm$^{-1}$) is an absorbance of the polymer at 1688 cm$^{-1}$ Av(C=C, 1610 cm$^{-1}$) is an absorbance of the polymer at 1610 cm$^{-1}$ The physical properties of the elastic yarns are shown in Table 2.

Comparative Examples 1 and 2

Polymer solutions were prepared in the same manner as that of Example 1, except that the amount of benzoyl chloride added at the time of the prepolymer reaction was $1.7 \times 10^{-5}$ mol, that is, ⅓ of the minimum necessary amount, X, for Comparative Example 1 and $5.6 \times 10^{-3}$ mol, that is, twice the upper limit of the amount, A/100, for Comparative Example 2. The results are given in Table 2.

Comparative Example 3

In this Comparative Example, a polymer solution was prepared in the same manner as that of Example 1, except that the prepolymer solution was prepared without the addition of benzoyl chloride at the time of the prepolymer solution reaction. The results are given in Table 2.

Comparative Example 4

In this Comparative Example, a polymer solution was prepared in the same manner as that of Example 1, except that acetic acid having an acid dissociation constant of 9 or more in dimethylacetamide was added in an amount of $1.1 \times 10^{-4}$ mol, that is, twice the minimum necessary amount, X). The results are given in Table 2.

Example 2

In this Example, the kind of the acidic substance was varied. A polymer solution was prepared in the same manner as that of Example 1, except that concentrated sulfuric acid (97%) was added in an amount of $1.1 \times 10^{-4}$ mol (that is, twice the minimum necessary amount, X) instead of benzoyl chloride. The results are given in Table 2.

Comparative Examples 5 and 6

Polymer solutions were prepared in the same manner as that of Example 1, except that concentrated sulfuric acid (97%) was added in an amount of $1.7 \times 10^{-5}$ mol, that is, ⅓ of the minimum necessary amount, X, for Comparative Example 5 and $5.6 \times 10^{-3}$ mol, that is, twice the upper limit of the amount, A/100, for Comparative Example 6. The results are given in Table 2.

Example 3

In this Example, the reaction temperature and the reaction time among the conditions for the prepolymer solution reaction used in Example 1 were changed to 50° C. and 50 min, respectively. A polymer solution was prepared in the same manner as that of Example 1, except that the amount of benzoyl chloride was changed to $3.8 \times 10^{-4}$ mol (that is, twice the minimum necessary amount, X) according to the change of the conditions. The results are given in Table 3.

Example 4

In this Example, the concentration of the prepolymer solution among the conditions for the prepolymer solution reaction used in Example 1 was changed to 70% by weight. A polymer solution was prepared in the same manner as that of Example 1, except that the polymer production time was 70 min and the amount of benzoyl chloride was changed to $5 \times 10^{-5}$ mol (that is, twice the minimum necessary amount) according to the change of the reaction condition. The results are given in Table 3.

Example 5

In this Example, DMF was used as the solvent instead of DMAc used in Example 1. A polymer solution was prepared in substantially the same manner as that of Example 1, except that the temperature and time for the production of the prepolymer were 30° C. and 70 min, respectively, and the amount of benzoyl chloride was $2.1 \times 10^{-3}$ mol (the minimum necessary amount). The results are given in Table 3.

Example 6

An example of the synthesis of a molten prepolymer according to the present invention will now be described. A reaction vessel equipped with a stirrer, a thermometer and a nitrogen sealing tube was charged with 100 parts of solid MDI, and the MDI was melted at 45° C. Then, 470.0 parts of PTMG (Mn=2000) was added thereto, and a prepolymer reaction was conducted at 80° C. for 150 min. After the completion of the reaction, the molten prepolymer was cooled to 30° C., 570 parts of DMAc was added thereto, and the prepolymer was dissolved in DMAc for 90 min with stirring. At that time, 15.4 mg ($1.1 \times 10^{-4}$ mol), that is, twice the minimum necessary amount, of benzoyl chloride was accurately weighed and added to the reaction vessel. The concentration of the residual isocyanate group at the time of completion of dissolution was 0.323. Then, 514 parts of a DMAc solution containing 7.6 parts of ethylenediamine (EDA) and 1.3 parts of diethylamine (DEA) was prepared, and a polyurethane solution was prepared in the same manner as that of Example 1. The results are given in Table 4.

Comparative Example 7 and 8

Polymer solutions were prepared in the same manner as that of Example 7, except that in dissolving the molten prepolymer in DMAc, the benzoyl chloride was added in an amount of $1.7 \times 10^{-5}$, that is, ⅓ of the minimum necessary amount, for Comparative Example 7 and $5.6 \times 10^{-3}$ mol for Comparative Example 8. The results are given in Table 3.

Symbols in each Table have the following respective meanings.

1) The terms "larger" and "smaller" are respectively intended to mean that the amount of the acidic substance added is larger and smaller than that specified in the scope of claims for patent.
2) 100% modulus (%) of 40 denier yarn
3) Strength (g) at breakage of 40 denier yarn
4) Elongation (g) at breakage of 40 denier yarn

Comparative Example 9

The polymer according to Comparative Example 1 was heated, while stirring, at 70° C. for 10 hours in the same manner as in Japanese Examined Patent Publication No. 47-35317 to obtain the product with the branching being cut. The degree of branching after treating was 5.3. The results are shown in Table 2.

Example 7

As shown in FIG. 1, 100 parts/min of 4,4'-diphenylmethane diisocyanate, 470 parts/min of tetramethylene ether glycol and 570 parts/min of dimethylacetamide (containing $2.7 \times 10^{-2}$ wt. % of benzoyl chloride) were continuously charged to a forced agitation type mixer by quantitative charge pumps. The average retention time was one minute. Thereafter, the mixed solution was charged to a pipe-line type reactor and the reaction was effected under the conditions of an average retention time of 100 minutes and a temperature of 30° C. to continuously obtain the prepolymer solution. Then, the flow of the resultant prepolymer solution (1140 parts/min) and 514 parts/min of the flow of an amine solution (7.6 parts of ethylenediamine, 1.3 parts of diethylamine and 505.1 parts of dimethylacetamide) were continuously fed to a forced agitation type mixer (average retention time=3 seconds) to effect the chain extension at 15° C. Thus, the polymer solution was obtained. The completion of the chain extension reaction was confirmed in the same manner as in Example 1. The results are shown in Table 2.

TABLE 2

| Ex. or Comp. Ex | Conditions for producing prepolymer | | Property of polymer Degree of branching (Nb) | Appearance of polymer solution | Molding stability | 2) Modulus (g) | 3) Ts (g) | 4) Te (%) |
| --- | --- | --- | --- | --- | --- | --- | --- | --- |
| | Production process | Kind and amount of acidic substance 1) | | | | | | |
| Comp. Ex. 3 | Solution | Benzoyl chloride, free | 15.3 | Gelated | — | Unspinnable due to gelation | | |
| Comp. Ex. 1 | Solution | Benzoyl chloride, smaller | 12.5 | Gelated | — | 2.5 | 50 | 540 |
| Ex. 1 | Solution | Benzoyl chloride, amount within present invention | 2.5 | Homogeneous and transparent | + | 3.2 | 72 | 750 |
| Comp. Ex. 2 | Solution | Benzoyl chloride, larger | 2.3 | Loss of transparency | ± | 2.1 | 50 | 500 |
| Comp. Ex. 4 | Solution | Acetic acid, free | 14.8 | Gel form | — | Unspinnable due to gelation | | |
| Comp. Ex. 5 | Solution | Sulfuric acid, smaller | 11.8 | Gel form | — | 2.6 | 51 | 590 |
| Ex. 2 | Solution | Sulfuric acid, amount within present invention | 2.8 | Homogeneous and transparent | + | 3.2 | 74 | 730 |
| Comp. Ex. 6 | Solution | Sulfuric acid, larger | 2.5 | Loss of transparency | ± | 2.0 | 53 | 560 |
| Ex. 7 | Solution continuous | Sulfuric acid, amount within present invention | 1.7 | Homogeneous and transparent | + | 3.1 | 80 | 790 |
| Comp. Ex. 9 | Conventional | — | 5.3 | Homogeneous and transparent - some gel form | ± | 3.0 | 65 | 600 |

1) The terms "larger" and "smaller" are respectively intended to mean that the amount of the acidic substance added is larger and smaller than that specified in the scope of claims for patent.
2) 100% modulus of 40 denier yarn (%)
3) Strength at breakage of 40 denier yarn (g)
4) Elongation at breakage of 40 denier yarn (g)

TABLE 3

| Ex. or Comp. Ex. | Conditions for producing prepolymer | | Property of polymer Degree of branching (Nb) | Appearance of polymer solution | Molding stability | 2) Modulus (g) | 3) Ts (g) | 4) Te (%) |
| --- | --- | --- | --- | --- | --- | --- | --- | --- |
| | Production process | Kind and amount of acidic substance 1) | | | | | | |
| Comp. Ex. 7 | Bulk | Benzoyl chloride, smaller | 8.9 | Gelated | — | Unspinnable due to gelation | | |
| Ex. 6 | Bulk | Benzoyl chloride, amount falling within present invention | 2.8 | Homogeneous and transparent | + | 3.3 | 70 | 680 |
| Comp. Ex. 8 | Bulk | Benzoyl chloride, larger | 2.5 | Loss of transparency | ± | 2.2 | 48 | 450 |

1) The terms "larger" and "smaller" are respectively intended to mean that the amount of the acidic substance added is larger and smaller than that specified in the scope of claims for patent.
2) 100% modulus of 40 denier yarn (%)
3) Strength at breakage of 40 denier yarn (g)
4) Elongation at breakage of 40 denier yarn (g)

TABLE 4

| Ex. or Comp. Ex | Production process | Conditions for producing prepolymer Reaction temp, time (°C., min)/ temp. (wt. %)/solvent | Degree of branching (Nb) | Property of polymer Appearance of polymer solution | Molding stability | 2) Modulus (g) | 3) Ts (g) | 4) Te (%) |
|---|---|---|---|---|---|---|---|---|
| Ex. 1 | Solution | 30, 90/50/DMAc | 3.2 | Homogeneous and transparent | + | 3.2 | 72 | 750 |
| Ex. 3 | Solution | 50, 50/50/DMAc | 4.5 | Homogeneous and transparent | + | 3.3 | 65 | 680 |
| Ex. 4 | Solution | 30, 70/70/DMAc | 3.0 | Homogeneous and transparent | + | 3.1 | 70 | 710 |
| Ex. 5 | Solution | 30, 70/50/DMF | 4.8 | Homogeneous and transparent | + | 3.3 | 65 | 670 |

2) 100% modulus of 40 denier yarn (%)
3) Strength at breakage of 40 denier yarn (g)
4) Elongation at breakage of 40 denier yarn (g)

As apparent from the results shown in Table 2, since the linear segmented polyurethaneurea of the present invention has a degree of branching of 3 or less, and is transparent in the form of a solution, it has a superior molding stability and can provide a molded article having higher physical properties, which are not obtained in the conventional method, i.e., improved modulus, high elongation and high strength, compared with cases where, at the time of the prepolymer reaction, no acidic substance is added (Comparative Example 3), an acidic substance is added in an excessively small amount (Comparative Examples 1 and 5), an acidic substance having an acid dissociation constant of 9 or more in DMAc is added (Comparative Example 4), an acidic substance is added in an excessively large amount (Comparative Examples 2 and 6), and the reduction of the branching is effected in the subsequent step (Comparative Example 9). This is also true of the molten prepolymer synthesis (Table 3). As apparent from the results given in Table 4, the effect of the present invention can be sufficiently attained even when conditions for the production of a prepolymer solution are remarkably varied. Furthermore, it is clear that the polymer obtained by the continuous processes of the prepolymer synthesis and the polymer production (Example 7) has better physical properties, compared with those obtained by the batchwise processes.

We claim:

1. A linear segmented polyurethaneurea having a degree of branching (Nb) of 3 or less and having a transmittance of 90% or higher as a 30 wt % solution of polymer in dimethylacetamide after the polyurethaneurea solution stands at 20° C. for two weeks and obtained by chain-extending a prepolymer with an organic diamine in an organic solvent comprising dimethylacetamide, said prepolymer having an isocyanate group at both ends thereof and comprising the reaction product of a stoichiometrically excessive amount of a diisocyanate component wherein said component is 4,4'-diphenylmethane diisocyanate, 2,4-toluene diisocyanate or 1,4-phenylene diisocyanate and polytetramethylene ether glycol having a number average molecular weight of 900 to 2500, wherein said prepolymer is prepared in the presence of at least one acidic substance, wherein said substance is at least one of benzoyl chloride, alkyl phosphoric acids, benzene sulfonic acid, p-toluene sulfonic acid, sulfurous acid gas, hydrochloric acid or sulfuric acid in the solvent in an amount (mol/kg of prepolymer solution) within the range defined by:
$5.5 \times 10^{-5} <$ amount of acidic substance added (mol/kg of prepolymer solution)$< 1.1 \times 10^{-4}$.

2. A linear segmented polyurethaneurea as claimed in claim 1, wherein the absorbance in an infrared spectrophotometry of the carbonyl group of the linear segmented polyurethaneurea satisfies the following relationship:

$$\frac{Av(C=0, 1688 \text{ cm}^{-1})}{Av'(C=C, 1610 \text{ cm}^{-1})} \leq 0.1$$

wherein $Av(C=0, 1688 \text{ cm}^{-1})$ is an absorbance of the polymer at 1688 cm$^{-1}$ $Av'(C=C, 1610 \text{ cm}^{-1})$ is an absorbance of the polymer at 1610 cm$^{-1}$.

3. A process for producing a linear segmented polyurethaneurea solution, comprising:

preparing a prepolymer solution by reacting a stoichiometrically excessive amount of a diisocyanate component wherein said component is 4,4'-diphenylmethane diisocyanate, 2,4-toluene diisocyanate or 1,4-phenylene diisocyanate with polytetramethylene ether glycol having a number average molecular weight of 900 to 2500, the molar ratio of diisocyanate to glycol being from 1.3 to 2.5 in the presence of dimethylacetamide as a solvent to prepare a solution of prepolymer having an isocyanate group at both ends thereof or reacting both the said diisocyanate component and the said glycol component in a molten state in the absence of a solvent to prepare a molten prepolymer and dissolving the prepolymer in a solvent to give a prepolymer solution, and chain-extending the prepolymer in the resultant prepolymer solution with an organic diamine to prepare a segmented polyurethaneurea solution, wherein the said prepolymer is prepared in the presence of at least one acidic substance wherein said substance is at least one of benzoyl chloride, alkyl phosphoric acids, benzene sulfonic acid, p-toluene sulfonic acid, sulfurous acid gas, hydrochloric acid or sulfuric acid in the solvent in an amount (mol/kg of prepolymer solution), within the range defined by:
$5.5 \times 10^{-5} \leq$ amount of acidic substance added (mol/kg of prepolymer solution)$\leq 1.1 \times 10^{-4}$.

4. A process as claimed in claim 3, wherein said acidic substance is at least one of sulfurous acid gas, hydrochloric acid or sulfuric acid.

* * * * *